United States Patent
Schwarze et al.

(10) Patent No.: US 8,430,360 B2
(45) Date of Patent: Apr. 30, 2013

(54) CONTROL UNIT AND METHOD FOR CONTROLLING THE SUPPLY OF A VEHICLE WITH MULTIPLE FUELS

(75) Inventors: Malte Schwarze, Hamm (DE); Andreas Westenberger, Buxtehude (DE)

(73) Assignee: Airbus Operations GmbH (DE)

( * ) Notice: Subject to any disclaimer, the term of this patent is extended or adjusted under 35 U.S.C. 154(b) by 319 days.

(21) Appl. No.: 12/940,091

(22) Filed: Nov. 5, 2010

(65) Prior Publication Data

US 2011/0101166 A1 May 5, 2011

Related U.S. Application Data

(60) Provisional application No. 61/258,281, filed on Nov. 5, 2009.

(30) Foreign Application Priority Data

Nov. 5, 2009  (DE) .......................... 10 2009 052 047

(51) Int. Cl.
*B64D 37/30* (2006.01)
(52) U.S. Cl.
USPC .................................. 244/135 R; 244/135 C
(58) Field of Classification Search .............. 244/135 C, 244/135 R, 172.2, 172.3; 123/577, 515
See application file for complete search history.

(56) References Cited

U.S. PATENT DOCUMENTS

| | | | | |
|---|---|---|---|---|
| 5,469,830 A | * | 11/1995 | Gonzalez | 123/515 |
| 6,507,782 B1 | * | 1/2003 | Rumbo et al. | 244/182 |
| 7,272,491 B1 | * | 9/2007 | Berard | 701/467 |
| 2007/0175459 A1 | * | 8/2007 | Williams et al. | 123/515 |

* cited by examiner

*Primary Examiner* — Tien Dinh
*Assistant Examiner* — Richard R Green
(74) *Attorney, Agent, or Firm* — Lerner, David, Littenberg, Krumholz & Mentlik, LLP

(57) ABSTRACT

A control unit for controlling the supply of a vehicle having at least one internal combustion engine with multiple fuels has at least one input means for supplying optimization parameters, fuel parameters, and operational data, at least one storage unit for storing the optimization parameters, the fuel parameters, and the operational data, and at least one computing unit. The control unit is adapted for being connected to at least one first supply apparatus for supplying a first fuel to the internal combustion engine and to at least one second supply apparatus for supplying a second fuel to the internal combustion engine, and of controlling a first mass flow of supplied first fuel and a second mass flow of supplied second fuel. The computing unit optimizes the ratio of first mass flow and second mass flow for all operational phases of the vehicle to fulfill the specified optimization parameters.

14 Claims, 2 Drawing Sheets

CONTROL UNIT AND METHOD FOR CONTROLLING THE SUPPLY OF A VEHICLE WITH MULTIPLE FUELS

CROSS-REFERENCE TO RELATED APPLICATIONS

This application claims the benefit of the filing date of U.S. Provisional Patent Application No. 61/258,281 filed Nov. 5, 2009, the disclosure of which application is hereby incorporated herein by reference.

BACKGROUND OF THE INVENTION

The invention relates to a control unit for controlling the supply of a vehicle with multiple fuels, a method for controlling the supply of a vehicle with multiple fuels, and an aircraft, which is adapted for being operable with multiple fuels.

Conventional fuels based on hydrocarbon, such as jet fuel, currently represent the backbone of fuel supply in aviation. However, it is obvious that existing fossil resources are inherently restricted, so that it must be expected that in future fuels such as jet fuel will no longer be able to be obtained and used at acceptable prices or in sufficient quantities. As a result of this development, it is unavoidable that alternative fuels will find their way into aviation. However, until such alternative fuels may be extensively provided, it is to be expected that multiple types of fuel will only be able to be provided in varying quantities at various locations worldwide, namely fuels based on hydrocarbons and alternative, future fuels. Until complete availability of alternative fuels is provided, it could be advantageous, in a transition phase, for aircraft and other vehicles to be designed in general for the purpose of being able to be operated using two different fuel types.

Only two aircraft are known in the prior art which have been modified in such a manner that an alternative fuel is usable in addition to jet fuel. Power plants were changed over in a modified B-57 as a demonstrator and in a modified Tupolev Tu-155, also as a demonstrator, so that selected experimental power plants could each be operated completely using hydrogen (LH$_2$) or liquefied propane gas (LNG). The modified Tu 155, for example, has three power plants, two of which are exclusively operated using jet fuel, while the third power plant, as an experimental power plant, is exclusively suitable either for use with liquid hydrogen or, with additional modification, for use with natural gas. On the system side, an application of two different fuels for all power plants used was not possible in any of the experimental power plants without prior retrofitting or the like.

BRIEF SUMMARY OF THE INVENTION

Correspondingly, a need could exist for a vehicle which is adapted for being operable using two different fuel types. Using such an aircraft it is to be possible to use both a typical fuel produced based on hydrocarbon, such as jet fuel, and also an alternative fuel usable for future aircraft, such as liquefied petroleum gas, natural gas, hydrogen or the like.

A need could also exist for a control unit which is adapted for supplying a vehicle with two different fuel types in the most optimum possible way.

Furthermore, a need could exist for optimizing the supply of a vehicle with multiple fuel types, so that depending on operating conditions and optimization parameters, optimum performance of the vehicle may always be provided and specified mission parameters may be fulfilled.

The need may be met by a control unit for controlling the supply of a vehicle with multiple fuels according to independent claim 1. Advantageous refinements may be inferred from the subclaims.

The required technical conditions for the operation of two different fuel systems are provided in many vehicles having internal combustion engines. In modern motor vehicles, multiple different fuels such as gasoline, liquefied petroleum gas (LPG), and compressed natural gas (CNG) may be used in a typical gasoline engine with only relatively slight modifications. Because of rising fuel costs, motor vehicles are also sometimes modified so that they have two fuel tanks and may change over between the use of the two fuels controlled by a switch in the vehicle interior, for example, between gasoline and LPG. In modern commercial aircraft, which use gas turbines for thrust generation, multiple fuel types may also be combusted in one combustion chamber through small modifications and the integration of suitable injection devices.

However, the core idea of the present invention is not in the general usability of multiple fuel types, but rather in the provision of an environment for the most optimized possible use of two or more fuel types in a vehicle, the optimization being able to be achieved using various data on specific properties of the fuels to be used and specified optimization parameters, the latter being dependent on the operation phases to be managed of a planned mission, which is performed using multiple different fuel types.

Remaining with the example of the aircraft, a mission comprises multiple flight phases, which comprise the takeoff, the climb, the cruise flight, the descent, optionally the holding flight, the landing, and movements on the taxiway ("taxiing"). Each of these flight phases differs from the others in central points, such as the flight velocity, the glide ratio, flap positions, the power setting of the power plants, and thus the effectiveness with which the aircraft is operated. These various parameters result in different fuel consumptions depending on the flight phase. The mass of the aircraft at the end of each flight phase is dependent on the fuel mass consumed up to this point, which is in turn dependent on the specific weight of the fuel used and the mass at the beginning of the flight phase. In each following flight phase in which flight occurs under the above-mentioned altered conditions, the fuel consumption is again dependent on the initial mass of the aircraft and the mass reduction in this following flight phase. In this way, each prior flight phase always has effects on each following flight phase according to the principle of feedback.

In addition, several different optimization parameters come into consideration, according to which the supply with multiple fuels may be optimized:

a) One optimization parameter may be identified to incorporating the load state in the optimization, which has an influence on the performance-optimized use of the various fuels. Through a varying mass reduction of the aircraft depending on the use of the fuels, the weight of the fuel and thus the load per unit area of the aircraft may be controlled at least within certain limits. The weight also particularly has a direct influence on the induced drag. Furthermore, optimum loads per unit area exist for various aircraft types for specific velocity states when cruising, in the case of which a very fuel-efficient flight may be performed. Through the use of an optimization parameter which is oriented to the load state, the aircraft may begin the cruise phase in such an optimal state, come particularly close thereto, or maintain this state for a particularly long time, in that the mass reduction of the aircraft is already calculated accordingly before entering this flight phase via the use of the various fuels and the fuel supply is optimally set thereto accordingly during the entire mission.

b) Another optimization parameter may be to control the center of gravity of the aircraft via the optimum supply of the various fuels, at least within limits, which is made possible by different locations of the various fuel tanks and their emptying at different times. It is thus particularly efficient when cruising, for example, to fly with a center of gravity location directed further toward the aircraft rear, while a more forward center of gravity location is to be selected during takeoff and landing for safety reasons.

c) A further optimization parameter may incorporate a weather prediction and/or information about current weather situations, since wind deviations, temperature deviations in altitude, other meteorological conditions or requirements, such as detours, may result in leaving planned routes. Through optimization oriented thereto, performance-optimized use of the two fuel may nonetheless be performed through the present invention.

d) Still a further optimization parameter may be to consider the availability of various fuel types at origin and destination airports, for example. As previously described, the probability exists that during a transition time, different quantities of various fuels will be available at different locations. Thus, for example, an alternative fuel which is carried along on a flight to a destination may be kept in reserve, since this alternative fuel is not yet available at the destination and current events, such as current wind situation, cause the use of the novel fuel type to appear more advantageous on a return flight.

e) In addition, a further optimization parameter may be that, for example, an alternative fuel is not yet permitted for specific flight phases in specific countries and a sufficient quantity of the typical fuel must be kept ready for predictable flight phases.

f) In addition, an optimization parameter may be provided for minimizing a fuel consumption for the entire mission.

g) Furthermore, an optimization parameter may be oriented to a maximization of the range which may be implemented using the vehicle. The ratio of the fuel mass flows may be selected, for example, so that in longer operational phases, for example, during cruising of an aircraft, the fuel which is carried along and which has a higher specific weight is used first as much is possible, in order to cause energy savings because of the more rapid reduction of the vehicle mass and thus an increase of the range h) Finally, still a further optimization parameter may be to achieve the least possible climate-relevant emission effects over the entire mission. For this purpose, it is to be noted that emissions from aircraft power plants are strongly dependent on the current flight altitude in their climate-damaging effect. In the case of such an optimization parameter, the use of various fuel types is to be adapted in such a manner that depending on the altitude, the fuel or a suitable mixture of multiple fuels promises the least possible climate-relevant effects, for this optimization in the device, a model of a climate-relevant dependence of each pollutant which arises upon the combustion of the two fuels being able to be defined depending on the altitude. As a result of such an optimization, the use of $LH_2$ may be substantially more favorable in the emission effect during takeoff and at low flight altitudes than jet fuel, for example. During cruising at high altitudes, in contrast, the use of jet fuel may be more advantageous in this regard. It may therefore also be a mixing ratio of both fuels, however.

The optimization parameters are not intended to be restricted to the above-mentioned non-exhaustive list. Rather, the parameters described from a) to h) may also be combined with one another as desired and other optimization parameters (not listed here) may also be incorporated.

In the case of significantly different fuels, such as jet fuel as the first fuel type and liquid hydrogen $LH_2$ as the second fuel type, the mass-specific energy ratio is approximately 1:2.8. This means that if liquid hydrogen is used, only 0.36 g must be used to achieve the same energy effect which occurs upon the injection of 1 kg of jet fuel. A mass reduction of the aircraft in flight per unit of time or over a specific covered distance also has very different results depending on the use of the fuel types. However, this mass reduction in the flight has a wide-ranging influence on the flight performances of the aircraft, for example, on the fuel consumption or on the maximum achievable range. However, it must be noted at this point that significantly greater efforts are to be made to carry along liquid hydrogen than if jet fuel is used, since the hydrogen must typically be carried along in cryogenic form and the devices and the tank required for this purpose have a higher weight than a typical jet fuel tank.

Through skilled control of the fuel supply, a significant performance advantage over the entire mission may thus be achieved with exploitation of the various mass-specific energies of the fuels. This advantage may be even greater independently thereof if a specific component of the fuels is not used during the mission, for example, if it is intended for a following mission or provided as a reserve. Moreover, the resulting performance advantage achievable by adapted fuel management may be lesser or also greater due to current events during the flight, for example, due to changed winds.

A control unit according to the invention accordingly coordinates the advantageous use of the various fuel types over the entire mission, considers the various flight phases, and then controls the supply of the various fuels into the internal combustion engine or engines according to the performed optimization or establishes their energy component in the entire fuel mass flow in the form of a mixing ratio of both fuels.

According to a first aspect of the invention, the control unit according to the invention for controlling the supply of a vehicle having at least one internal combustion engine with multiple fuels is equipped with at least one input means for supplying optimization parameters, fuel parameters, and operational data, at least one storage unit for storing the optimization parameters, the fuel parameters, and the operation data, and at least one computing unit. The control unit according to the invention is further adapted for being connected to at least one supply apparatus for supplying a first fuel to the internal combustion engine and to at least one second supply apparatus for supplying a second fuel to the internal combustion engine, controlling a first mass flow of supplied first fuel and a second mass flow of supplied second fuel, and establishing, using the computing unit, the ratio of first mass flow and second mass flow for operational phases of the vehicle to fulfill the optimization parameters in consideration of the fuel parameters, storing it in the storage unit, and implementing it during the performance of the operational phases by controlling the first mass flow and the second mass flow. The connection includes the possibility of the action of the control unit according to the invention on the first and the second supply apparatuses, so that the control unit according to the invention may initiate or end the operation of a supply apparatus, and establishing the quantity of the fuels supplied to an internal combustion engine.

In a first procedure, a ratio of first fuel mass flow to second fuel mass flow may be set, which permits the simultaneous use of both fuel types in a mixing ratio, for example, during a transition between two operational phases or during a holding flight, for example, to lengthen the possible flight time. In another procedure, one fuel type or the other fuel type is used exclusively, depending on the respective operational phase and the optimization parameters.

A parallel use of two different fuel types may be implemented, for example, in that during the use of internal combustion engines, combustion chambers are provided which are modified in such a manner that multiple fuel types may be introduced therein through independent supply openings, injection systems, or the like. The combustion chambers may have a suitable injection area for each fuel type to be used, for example, so that the combustions of multiple different fuels do not interfere with one another.

Furthermore, the control unit according to the invention is adapted for receiving data about the available mass of first fuel and second fuel and information about the mass-specific energy and/or its caloric value via a data input module or the like. The control unit according to the invention is made capable therefrom of supplying the power plants with a required fuel flow, which results in sufficient provision of thrust energy by the internal combustion engine. The control unit according to the invention may deliver the first fuel or the second fuel alternatively or in parallel to one another to the internal combustion engine.

The control unit according to the invention is preferably further adapted for receiving data about the planned operation via the data input module, for example, so that an optimum supply of the fuels is set depending on specified optimization parameters.

In an advantageous refinement, the control unit according to the invention is adapted for receiving data from a thrust control input means. Through the control unit according to the invention, the ratio between first mass flow and second mass flow may be formed so that the delivered total energy quantity results from the combustion of the first mass flow and the second mass flow, the delivered total energy quantity being able to result depending on request of a power plant control unit (in an aircraft of the producer AIRBUS, for example, through a so-called FADEC, which stands for "Full Authority Digital Engine Control").

The need may also be met by an aircraft having at least one internal combustion engine, at least two fuel tanks for carrying along a first fuel and a second fuel, a control unit according to the invention, and a first supply apparatus and a second supply apparatus. The first and the second supply apparatuses may be implemented as injection devices for a combustion chamber of an internal combustion engine, for example. In the case of an aircraft, using various injection devices for the respective fuel types in an optimized manner in the combustion chamber of one or more gas turbines and separating the injection areas from one another to avoid interference between two types of fuel would suggest itself.

The control unit according to the invention is responsible in this configuration for maximizing a range, accordingly considering permitted and non-permitted fuels for specific flight phases, and reacting to infrastructure conditions at various destination airports. An aircraft may thus be provided which allows performance-optimized operation with respect to the use of different fuel types.

In addition, a method according to the invention for controlling the supply of a vehicle having at least one internal combustion engine with multiple fuel types also meets the above-mentioned need.

The fundamental method steps are in the supply of optimization parameters, fuel parameters, and operational data having data of operational phases of a mission to be performed by the vehicle, ascertaining in each case a required first mass flow for a first fuel and a required second mass flow of a second fuel for an operational phase, ascertaining the respective final mass of the vehicle after ending the operational phase using the first mass flow or the second mass flow, ascertaining the respective specific fuel consumption $c_{TL}$ upon use of the first fuel or the second fuel, comparing the specific fuel consumptions, subsequently selecting a suitable fuel having suitable specific fuel consumption after scaling, and supplying the selected fuel to the internal combustion engine.

The scaling of a specific fuel consumption supports the direct comparability during the performance of the method according to the invention. Possible scaling may be performed, for example, in that a fuel consumption of a first or second fuel, which is specified in mass per unit of time, is multiplied by its associated mass-specific caloric value, which is specified in kJ/kg, for example. The respective specific fuel consumption values are thus uncoupled from the respective density of the fuel types, which particularly differ from one another in the meaning of the invention. Rather, the specific energy moves in the foreground, which has a clearly universal character. As a result, the energy-specific fuel consumptions have the same magnitude and may be compared directly to one another in the method.

In order to achieve a direct comparability in the meaning of the method according to the invention, other methods may also be used for scaling.

In an advantageous refinement of the method according to the invention, iteration steps for ascertaining an optimum mixing ratio $\Phi$ may additionally be performed for the consideration of a mixed supply of first and second fuels, which essentially lie in ascertaining a required first mass flow and a second mass flow at a first mixing ratio $\Phi$, ascertaining a resulting final mass of the vehicle, and calculating the specific fuel consumption. By changing the mixing ratio $\Phi$ and performing these iteration steps again, an optimum mixing ratio may be ascertained to optimize the specific fuel consumption according to the specified optimization parameters.

It is obvious that by iterative performance of the calculation steps for all operational phases of the vehicle, an overall consideration of fuel types to be used may be implemented.

Furthermore, a display unit may be activated for informational purposes and to monitor the function.

A consideration of an electrical drive which is usable in parallel or sequentially in the actual optimization of the use of two different fuel types would also be advantageous. A particularly favorable energy and weight balance may be achieved for established mission phases.

In addition, it would be particularly advantageous to be able to connect the control unit to fuel tanks sensors through corresponding signal or data inputs, so that the fill level of fuel tanks is always known and input or refueling errors may thus be nearly prevented. An adaptation of the method according to the invention may be performed so that only the fuel quantity which is carried along and the fuel which is available at a destination are always considered in the optimization consideration.

Finally, an aircraft having at least two fuel systems for at least two different fuels, at least one internal combustion engine, and at least one control unit having the above-mentioned technical features meets the above-mentioned need.

BRIEF DESCRIPTION OF THE DRAWINGS

Further features, advantages, and possible applications of the present invention result from the following description of the exemplary embodiments and the figures. All features which are described and/or shown in the figures form the subject matter alone and in any desired combination, independently of their wording in the individual claims or what they refer back to. Furthermore, identical reference numerals stand for identical or similar objects in the figures.

FIGS. 3a and 3b show a schematic block diagram of a method according to the invention.

DETAILED DESCRIPTION

Figure 1:
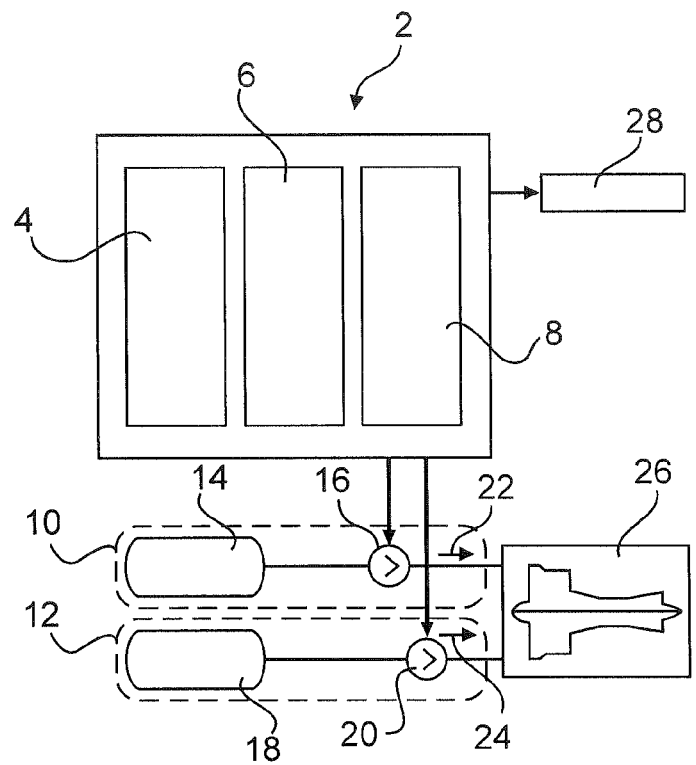
FIG. 1 shows a schematic view of a control unit according to the invention.

FIG. 1 schematically shows a control unit 2 according to the invention, which is equipped with an input means 4 and a computing unit 6. The input means 4 is adapted for acquiring numerous data and providing them for further processing. Stored data may be saved in a storage unit 8.

The control unit 2 according to the invention is connected to a first supply apparatus 10 and a second supply apparatus 12, the first supply apparatus 10 having a first fuel tank 14 and a first injection pump 16 and the second supply apparatus 12 having a second fuel tank 18 and a second injection pump 20.

The control unit 2 is thus capable, by activating the first supply apparatus 10 and the second supply apparatus 12, of conducting a first mass flow 22 and a second mass flow 24 to an internal combustion engine 26. Only a single power plant is shown as the internal combustion engine 26 here as an example, of course, however, it is obvious that multiple power plants may be connected to the first supply apparatus 10 and the second supply apparatus 12 by a parallel circuit, for example.

The control unit 2 according to the invention may be supplied with operational data and optimization parameters as well as fuel parameters, the operational data having data about a mission to be performed. If the control unit 2 according to the invention is used in an aircraft, for example, such data may comprise the time sequence of the takeoff, the climb, the cruise, the descent, and the landing and any holding flight, taxiing on the ground, and the like. In addition to all velocities and altitudes required for managing the individual operational phases, ascent and descent rates may also be ascertained from the stored data or are already provided.

According to the criteria described in the introductory part, suitable optimization parameters may control the optimization performed by the computing unit 6 in such a manner that, for example, a range maximization, a fuel consumption minimization, or the like may be implemented by the corresponding vehicle.

The control unit 2 according to the invention is adapted for establishing, from the operational data and optimization parameters and the fuel parameters, in what ratio a first fuel from the first fuel tank 14 and a second fuel from the second fuel tank 18 are to be used for the operational phases to be performed. The established mass flow ratios are stored in the storage unit 8 and may be retrieved during the entire operation, in order to control the injection pumps 16 and 20 accordingly during the operation.

The control unit 2 according to the invention is not restricted to ascertaining the mass flow ratios to be occupied before performing the operation, but rather a new optimization may be performed continuously or at regular intervals or on request if unplanned events occur during the entire operation.

It is particularly advantageous for the information of the vehicle driver to provide a display unit 28, which presents the mass flow ratios for the operational phases to be performed in graphically prepared form to the vehicle driver, so that certainty always exists about the proper function of the control unit 2 according to the invention and the preliminary planned sequence of the use of the fuels over the flight phases is shown.

Feedback of a vehicle driver with the control unit 2 according to the invention may particularly advantageously also occur if a system error existed, for example, which categorically prevented the use of one fuel type. This may be performed via feedback of the control unit 2 according to the invention using a corresponding signal, which may be input into the input means 4.

The control unit 2 according to the invention is shown as a single component, however, it is obvious for a person skilled in the art that instead of such a simplex configuration, a typical duplex or triplex configuration may also be implemented, which may meet a redundancy which is required for critical vehicle systems.

Figure 2:
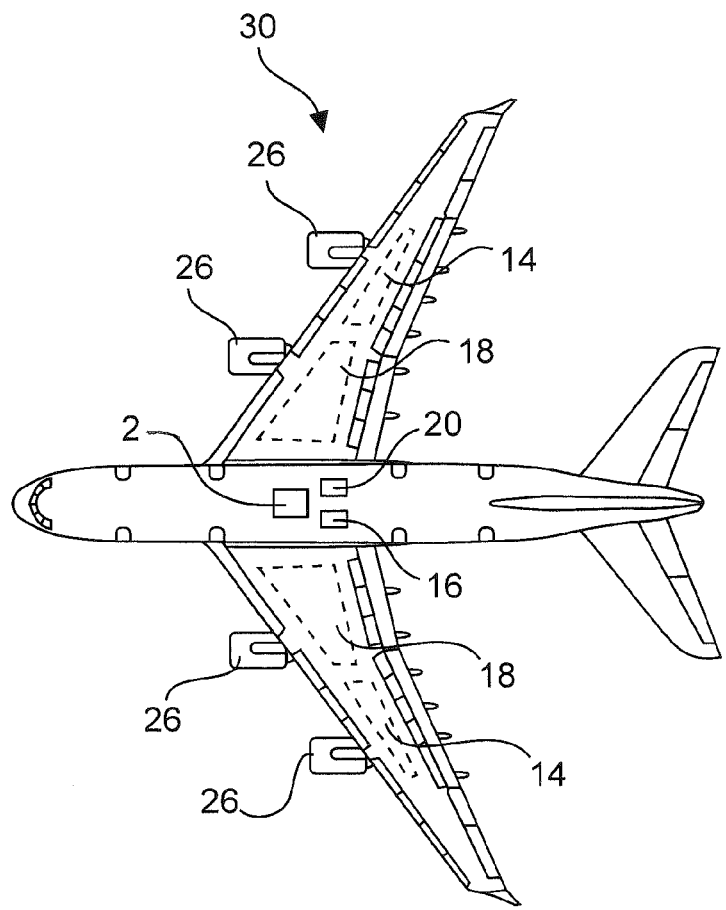
FIG. 2 shows an aircraft according to the invention.

FIG. 2 shows an aircraft 30, which, entirely as an example, has two first fuel tanks 14 and two second fuel tanks 18, which are connected via injection pumps 16 and 20 to the power plants 26. Furthermore, one or more control units 2 according to the invention are connected to the injection pumps 16 and 20 in order to specify optimum mass flow ratios for the power plants 26 during the flight.

Figure 3B:
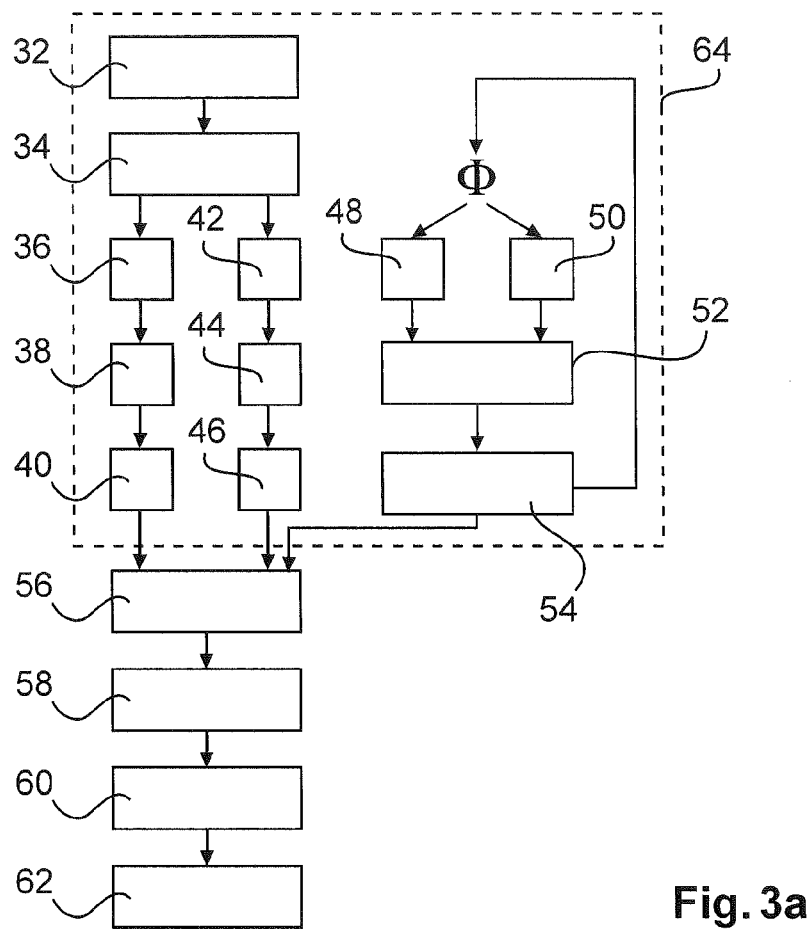
Figure 3B:
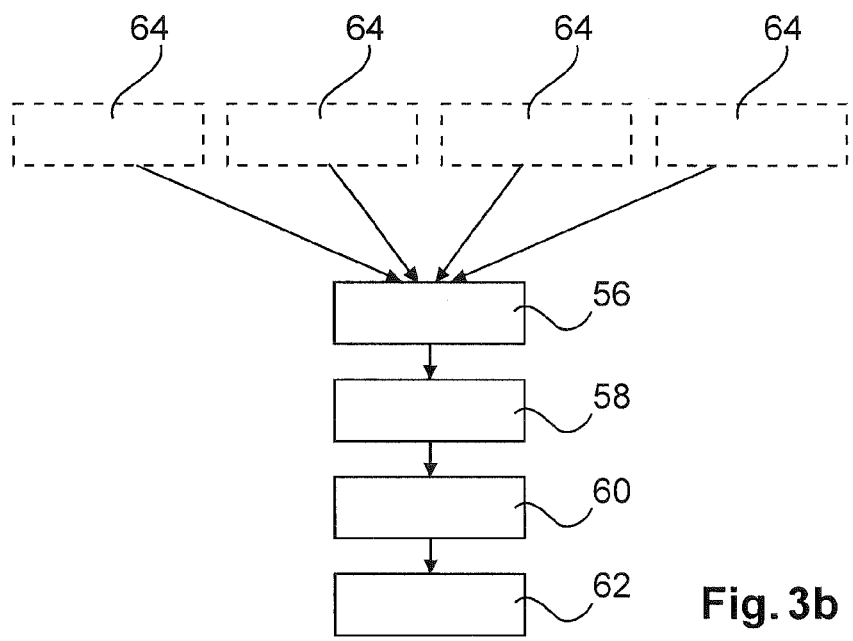

The method according to the invention for controlling the supply of a vehicle having at least one internal combustion engine with multiple fuel types is schematically shown in a block diagram in FIGS. 3a and 3b.

The method according to the invention may begin, for example, with the input or the supply 32 of parameters which are required for the optimization. These parameters may fundamentally include:

- Information about detours to be performed, which are established by an air traffic control, for example ("Air Traffic Control", ATC);
- information about the current wind situation along the planned route, which may fundamentally be updated during the flight;
- information about the mass-specific and/or volume-specific energy of a first fuel type;
- mass-specific energy of a second fuel type (similarly);
- waypoints in the three-dimensional space of the mission, for example, to be obtained from an avionics device;
- information about the currently required thrust, typical or mean thrust of each flight phase or the current flight phase;
- initial mass, depending on the load state;
- available mass, available volume, or available energy of the first fuel type;
- availability of the fuels at the origin and destination airports;
- regulations which restrict the use of specific fuel types for specific flight phases.

If the method according to the invention is used in aircraft, in addition to the inquiry before the flight or regular communications from a ground control station, current wind data may be ascertained/updated/supported in particular also during the flight by internal aircraft measuring and calculation apparatuses.

The following method steps are performed for each essential flight phase. The optimization of the fuel types of a single flight phase is described in greater detail hereafter as an example.

After the supply 32 of the parameters required for the optimization, they may be stored in a storage unit 34, so that a required mass flow or energy flow for a first fuel type in the relevant flight phase is then ascertained 36 in the control unit 2 using the computing unit 6 in a first step. The consumed mass of the first fuel type and, therefrom, the final mass of the aircraft after ending this flight phase, may be calculated therefrom 38. Subsequently, the specific fuel consumption $c_{TL}$ is ascertained 40, which is performed using the following formula, for example:

$$c_{TL} = \frac{m_T \cdot g}{F \cdot t};$$

t being a calculated duration of the flight phase, F being the thrust force, and $m_T$ being the mass of the consumed fuel. The index "TL" identifies the association with turbo air-jet power plants here.

To establish these variables, the horizontal extension ("distance over ground") of the vehicle in the flight phase is also of special significance.

Subsequently thereto, the required mass flow or energy flow for the second fuel type may also be ascertained similarly 42. The final mass of the aircraft resulting therefrom may also be calculated for this fuel type 44, and the specific fuel consumption $c_{TL}$ resulting therefrom may be calculated 46.

These method steps may fundamentally be performed for an arbitrary number of possible fuel types, the exemplary description provided here being restricted to a first and a second fuel type.

Using a predetermined mixing ratio $\Phi$ of the first fuel type and the second fuel type, required partial mass flows or partial energy flows are ascertained for the first fuel type 48 and are ascertained for the second fuel type 50. The final mass of the aircraft resulting therefrom is calculated 52. The specific fuel consumption $c_{TL}$ is also calculated therefrom 54. In consideration of the availability and regulation/scaling of $c_{TL}$, the mixing ratio is optimized from the following Breguet range formula, i.e., a value $\Phi_{opt}$ is sought:

$$R = \frac{v}{c_{TL,opt}} \cdot \frac{c_A}{c_W} \ln \frac{m_A}{m_E}.$$

In the optimization process for the individual flight phases, the value for the optimum specific fuel consumption $c_{TL, opt}$ is the lowest possible specific fuel consumption ($c_{TL, opt}$ is thus $c_{TL\ min}$ as an example here) upon selection of the overall optimization goal "low fuel consumption". An alternative would be the maximization of the range (R in the above formula) or minimum damage to the environment in this case.

In the latter case, upon the optimization for the least emission-related climate effects, for example, which emissions occur upon use of a specific fuel may be stored in the storage unit 8. In addition, which climate-damaging effect a specific emission may have as a function of the altitude may also be stored. A "global warming parameter" suggests itself as a "quantification parameter" for the climate-damaging effect. In the method, the height band of each flight phase and its duration may be calculated. The climate-damaging effect of a flight phase for one fuel type or another fuel type or a mixing ratio may thus be estimated. The fuel having the least effects for the flight phase is selected.

Finally, the specific fuel consumptions $c_{TL}$ from the use of the first fuel type, the second fuel type, and a mixture of both fuel types may be compared to one another 56 after suitable scaling, for example, by multiplication of the various $c_{TL}$ values by the respective mass-specific caloric value. The operation of the power plant is set accordingly 58 from the selection of an optimum specific fuel consumption $c_{TL}$ and thus a fuel type. For this purpose, for example, fuel valves and/or fuel pumps 16 and 20 may be set 60. An output module of a display unit may be activated simultaneously 62.

In the optimization process of the overall mission, the following procedure may be selected. For each flight phase, a specific fuel consumption $c_{TL}$ for a first fuel type, for a second fuel type, and, especially in the advanced mode of operation, also for multiple mixing ratios $\Phi$ of the first fuel type and the second fuel type, may be calculated 64 in the form of variants. The availability and possible regulations of the use of these fuel types are also considered in each case.

Subsequently, the different variants of the relevant flight phase are in turn arrayed one after another in varying composition to form the overall mission and thus also form multiple variants of the overall mission. These variants may be compared to one another 66 and judged with respect to the overall optimization goal (for example, "minimum fuel consumption"), after which the variant having the optimum specific overall consumption (or another optimization parameter) is selected. The fuel use or the mixing ratio in the individual flight phases is also established therewith.

For this purpose, the individual flight phases may be connected to one another in such a manner that the final mass of the prior flight phase forms the initial mass of the following flight section, similarly also the initial altitude and flight velocity. The results of the Breguet range formula for each flight phase may subsequently be added up to ascertain the total possible range.

The use of a selected fuel or a fuel mixture is conducted via an output and control module in the flight phases to injection valves, fuel pumps, and the like to activate the two fuel systems, which are independent of one another, so that the desired fuel use or the desired mixing ratio results for the flight phase.

The above-mentioned Breguet range formula is considered here as an example of an exemplary algorithm, more advanced calculation algorithms are conceivable. In propeller aircraft, instead of the thrust, the performance caused by the propeller is typically used. The Breguet formula may change to the following form:

$$R = \frac{\eta_A}{c_{pA}} \cdot \frac{c_A}{c_W} \ln \frac{m_A}{m_E},$$

in which $c_{pA}$ may represent the specific fuel consumption for propeller aircraft, in contrast to $c_{TL}$ for turbo air-jet power plants. $\eta_A$ is a drive efficiency for propeller aircraft.

The comparability of the specific fuel consumption in the computing method generally presumes a corresponding scaling of $c_{TL}$. For this purpose, for example, $c_{TL}$ may be scaled using the ratio of the mass-specific caloric values of the fuels. The parameter $c_{TL}$ includes the weight of the fuel, which differs depending on the fuel type used. The scaling ensures that $c_{TL}$ relates to the energy used in the flight phase. This results in a universal definition and permits the direct comparability of the scaled fuel consumption values.

In addition, it is to be noted that "comprising" does not exclude other elements or steps and "a" or "one" does not exclude multiples. Furthermore, it is to be noted that features which were described with reference to one of the above exemplary embodiments may also be used in combination with other features of other above-described exemplary embodiments. Reference numerals in the claims are not to be viewed as a limitation.

LIST OF REFERENCE NUMERALS 2 control unit
4 input means
6 computing unit
8 storage unit
10 first supply apparatus
12 second supply apparatus
14 first tank
16 injection pump
18 second tank
20 injection pump
22 first mass flow
24 second mass flow
26 internal combustion engine (alternatively power plant)
28 display unit
30 aircraft
32 supply of optimization parameters
34 saving in storage unit
36 ascertaining required first mass flow
38 calculating final mass
40 ascertaining specific fuel consumption
42 ascertaining second mass flow
44 calculating final mass
46 calculating specific fuel consumption
48 ascertaining partial mass flow
50 ascertaining partial mass flow
52 calculating final mass
54 calculating specific fuel consumption
56 scaling and comparing specific fuel consumptions
58 setting operation of power plants
60 setting fuel valves and/or fuel pumps
62 activating display unit
64 mixing ratio calculation

The invention claimed is:

1. A control unit for controlling the supply of a vehicle having at least one internal combustion engine with multiple fuels, comprising:
at least one input means for supplying optimization parameters, fuel parameters, and operational data having data of operational phases of a mission to be performed by the vehicle;
at least one storage unit for storing the optimization parameters, the fuel parameters, and the operational data; and
at least one computing unit;
wherein the at least one control unit is adapted:
for being connected to at least one first supply apparatus for supplying a first fuel to the at least one internal combustion engine and to at least one second supply apparatus for supplying a second fuel to the at least one internal combustion engine;
for controlling a first mass flow of the supplied first fuel and a second mass flow of the supplied second fuel; and
for using the at least one computing unit, establishing a ratio of first mass flow and second mass flow for one or more operational phases of the vehicle to fulfill the optimization parameters in consideration of the fuel parameters, storing the optimization parameters in the storage unit, and implementing the optimization parameters during the performance of the operational phases by controlling the first mass flow and the second mass flow.

2. The control unit of claim 1, wherein the optimization parameters are set to maximize a range of a mission to be covered by the vehicle.

3. The control unit of claim 1, wherein the optimization parameters are set to minimize fuel consumption.

4. The control unit of claim 1, wherein the optimization parameters are set to minimize climate-damaging effects of emissions.

5. The control unit of claim 1, which is adapted for displaying ascertained ratios of first mass flow to second mass flow for at least one operational phase of the vehicle via a display unit connected to the control unit.

6. An aircraft comprising:
at least one power plant;
at least one first fuel tank for carrying along a first fuel;
at least one second fuel tank for carrying along a second fuel;
a first supply apparatus;
a second supply apparatus; and
a control unit for controlling a supply of the at least one power plant with a first fuel and a second fuel according to claim 1.

7. A method for regulating the supply of at least one internal combustion engine of a vehicle with multiple fuels, comprising:
providing optimization parameters, fuel parameters, and operational data having data of operational phases of a mission to be performed by the vehicle;
ascertaining in each case a required first mass flow for a first fuel and a required second mass flow of a second fuel for an operational phase;
ascertaining in each case the final mass of the vehicle after ending the operational phase using the first mass flow or the second mass flow;
ascertaining in each case a specific fuel consumption upon use of the first fuel or the second fuel;
scaling and comparing the specific fuel consumptions;
selecting a suitable fuel having suitable predetermined fuel consumption; and
supplying the selected fuel to the internal combustion engine.

8. The method of claim 7, further comprising:
(a) ascertaining a required first mass flow and a second mass flow at a first mixing ratio;
(b) ascertaining a resulting final mass of the vehicle;
(c) calculating the specific fuel consumption; and
(d) changing the first mixing ratio and performing steps (a)-(d) again to optimize the specific fuel consumption according to the optimization parameters.

9. The method of claim 8, further comprising:
iteratively performing the calculation step for a plurality of operational phases of the vehicle.

10. The method according to claim 7, further comprising:
activating a display unit.

11. The method according to claim 7, wherein the method is performed again once or multiple times after beginning the mission.

12. The method according to claim 7, wherein the step of ascertaining the required first mass flow and the required second mass flow is performed in consideration of a maximization of a range of the mission to be covered by the vehicle.

13. The method according to claim 7, wherein the step of ascertaining the required first mass flow and the required second mass flow is performed in consideration of a minimization of the fuel consumption.

14. The method according to claim 7, wherein the step of ascertaining the required first mass flow and the required second mass flow is performed in consideration of a minimization of climate-damaging effects of emissions.

* * * * *